(12) United States Patent
Hwang (10) Patent No.: US 9,941,755 B2
(45) Date of Patent: Apr. 10, 2018

(54) METHOD AND APPARATUS FOR TRANSMITTING POWER WIRELESSLY

(71) Applicant: HITACHI-LG DATA STORAGE KOREA, INC., Seoul (KR)

(72) Inventor: Hosung Hwang, Seoul (KR)

(73) Assignee: HITACHI-LG DATA STORAGE KOREA, INC., Seoul (KR)

( * ) Notice: Subject to any disclaimer, the term of this patent is extended or adjusted under 35 U.S.C. 154(b) by 350 days.

(21) Appl. No.: 14/663,049

(22) Filed: Mar. 19, 2015

(65) Prior Publication Data

US 2015/0270718 A1     Sep. 24, 2015

(30) Foreign Application Priority Data

Mar. 20, 2014   (KR) .................. 10-2014-0032873

(51) Int. Cl.
| | |
|---|---|
| *H02J 50/80* | (2016.01) |
| *H02J 50/90* | (2016.01) |
| *H04B 5/00* | (2006.01) |
| *H02J 7/02* | (2016.01) |
| *H02J 50/40* | (2016.01) |
| *H02J 50/12* | (2016.01) |

(52) U.S. Cl.
CPC .............. *H02J 50/90* (2016.02); *H02J 7/025* (2013.01); *H02J 50/12* (2016.02); *H02J 50/40* (2016.02); *H02J 50/80* (2016.02); *H04B 5/0037* (2013.01); *H04B 5/0075* (2013.01); *H04B 5/0087* (2013.01); *H04B 5/0031* (2013.01)

(58) Field of Classification Search
CPC .. H02J 7/025; H02J 50/10; H02J 50/12; H02J 50/40; H02J 50/80; H02J 50/90; H04B 5/0025; H04B 5/0031; H04B 5/0037; H04B 5/0075; H04B 5/0087
USPC ......................................................... 307/104
See application file for complete search history.

(56) References Cited

U.S. PATENT DOCUMENTS

| | | | | |
|---|---|---|---|---|
| 2012/0139356 | A1* | 6/2012 | Jung ...................... | H02J 7/025 |
| | | | | 307/104 |
| 2013/0062961 | A1* | 3/2013 | Park ...................... | H02J 50/12 |
| | | | | 307/104 |
| 2014/0094116 | A1* | 4/2014 | Walley .................. | H02J 7/0004 |
| | | | | 455/41.1 |

(Continued)

*Primary Examiner* — William Hernandez
(74) *Attorney, Agent, or Firm* — Birch, Stewart, Kolasch & Birch, LLP (57) ABSTRACT

Disclosed are an apparatus and a method for transmitting power wirelessly. The method for transmitting power wirelessly includes: detecting whether a receiving apparatus moves while wirelessly transmitting the power to the receiving apparatus through magnetic inductive coupling; performing the magnetic inductive coupling with the receiving apparatus for each of two or more primary coils when it is detected that the receiving apparatus moves; and determining whether to change the primary coil connected with the receiving apparatus based on a result of the magnetic inductive coupling. A signal strength message received from the receiving apparatus is received and stored every primary coil magnetically inductively coupled with the receiving apparatus, and it is determined that the received apparatus is connected through a primary coil corresponding to a largest value among signal strength values included in the signal strength message.

8 Claims, 6 Drawing Sheets

(56) References Cited

U.S. PATENT DOCUMENTS

| | | | |
|---|---|---|---|
| 2015/0054347 A1* | 2/2015 | Amano | H04B 5/0087 307/104 |
| 2016/0118179 A1* | 4/2016 | Park | H01F 27/2871 320/108 |
| 2016/0294227 A1* | 10/2016 | Podkamien | H02J 5/00 |

* cited by examiner

METHOD AND APPARATUS FOR TRANSMITTING POWER WIRELESSLY

This application claims the benefit of priority of Korean Patent Application No. 10-2014-0032873 filed on Mar. 20, 2014, which is incorporated by reference in its entirety herein.

BACKGROUND OF THE INVENTION

Field of the Invention

The present invention relates to a method and an apparatus for transmitting power wirelessly.

Discussion of the Related Art

In recent years, with the development of communication and information processing technology, use of smart devices such as a smart phone, and the like has gradually increased and at present, a charging scheme generally applied to the smart devices is a scheme that directly connects an adapter connected to a power supply to the smart device to charge the smart phone by receiving external power or connects the adapter to the smart device through a USB terminal of a host to charge the smart device by receiving USB power.

In recent years, in order to reduce inconvenience that the smart device needs to be directly connected to the adapter or the host through a connection line, a wireless charging scheme that wirelessly charges a battery by using magnetic coupling without an electrical contact has been gradually applied to the smart device.

There are several methods for wirelessly supplying or receiving electric energy and representative methods include an inductive coupling scheme based on an electromagnetic inductive phenomenon and an electromagnetic resonance coupling scheme based on an electromagnetic resonance phenomenon based on a wireless power signal of a specific frequency.

In both schemes, data is transmitted and received by forming a communication channel between a wireless charging apparatus and an electronic apparatus such as the smart device to secure stability in power transmission and increase transmission efficiency. A phenomenon may occur, in which the power transmission is interrupted due to noise generated in the communication channel or a power receiving apparatus moves while wirelessly transmitting power, and as a result, transmission efficiency may deteriorate.

In particular, even in a multiple coil wireless power transmission scheme, since a primary coil for the power transmission is selected as one-time recognition operation at the time of first recognizing a receiving apparatus, even though relative positions of a transmitting apparatus and the receiving apparatus are changed, power is just transmitted with low efficiency through the primary coil which is first recognized even after.

SUMMARY OF THE INVENTION

The present invention is contrived to solve the problem and an object of the present invention is to provide a wireless power transmitting apparatus that can secure stability in wireless power transmission.

Anther object of the present invention is to provide a method for preventing power transmission efficiency from deteriorating due to a change in relative positions of a wireless power transmission apparatus and a wireless power receiving apparatus.

In accordance with an embodiment of the present invention, a method for transmitting power wirelessly includes: detecting whether a receiving apparatus moves while wirelessly transmitting the power to the receiving apparatus through magnetic inductive coupling; performing the magnetic inductive coupling with the receiving apparatus for each of two or more primary coils when it is detected that the receiving apparatus moves; and determining whether to change the primary coil connected with the receiving apparatus based on a result of the magnetic inductive coupling.

In accordance with another embodiment of the present invention, an apparatus for transmitting power wirelessly includes: a power converter including an inverter for converting DC power into AC power, two or more resonance circuits, and a sensing unit for measuring current or voltage that flows on the resonance circuit; a switching unit for connecting two or more resonance circuits to the inverter; and a controller for selecting the resonance circuit to be connected to the inverter by controlling the switching unit, extracting a message transmitted by the receiving apparatus that receives the power through magnetic induction of the resonance circuit based on a change in current or voltage measured by the sensing unit, controlling power transmission to the receiving apparatus by controlling the inverter based on the extracted message, and selecting one resonance circuit to transmit the power to the receiving apparatus among two or more resonance circuits based on the message, and the controller detects whether the receiving apparatus moves while wirelessly transmitting the power to the receiving apparatus, performs magnetic inductive coupling with the receiving apparatus for each two or more resonance circuits when detecting that the receiving apparatus moves, and determine whether to change the resonance circuit connected with the receiving apparatus based on a result of the magnetic inductive coupling.

The controller may detect whether the receiving apparatus moves based on an error associated message received from the receiving apparatus.

The controller may determine that the receiving apparatus moves when an error value included in the error associated message is larger than a predetermined error value.

The controller may receive and store a signal strength message received from the receiving apparatus for each resonance circuit magnetically inductively coupled with the receiving apparatus and determine whether to change the resonance circuit connected with the receiving apparatus based on the stored signal strength message.

The controller may determine that the receiving apparatus is connected through a resonance circuit corresponding to a largest value among signal strength values included in the signal strength messages.

Accordingly, even though relative positions of a wireless power transmitting apparatus and a wireless power receiving apparatus are changed, power can be stably transmitted without deterioration of power transmission efficiency.

Further, it is possible to prevent excessive heat from being generated in the receiving apparatus due to the deterioration of the power transmission efficiency and power loss.

DETAILED DESCRIPTION OF THE EMBODIMENTS

Hereinafter, embodiments of an apparatus and a method for wireless transmitting power according to the present invention will be described in detail with reference to the accompanying drawings.

Figure 1:
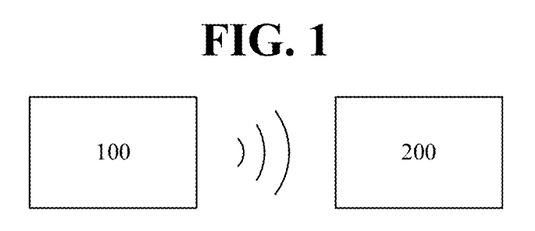
FIG. 1 conceptually illustrates wirelessly transmitting power to an electronic apparatus from a wireless power transmitting apparatus.

FIG. 1 conceptually illustrates wirelessly transmitting power to an electronic apparatus from a wireless power transmitting apparatus.

A wireless power transmitting apparatus 100 may be a power transferring apparatus that wirelessly transfers power required by an electronic apparatus 200 or a wireless charging apparatus for charging a battery of the electronic apparatus 200 by wirelessly transferring power or may be implemented by various types of apparatuses that transfer power to the electronic apparatus 200 requiring power in a non-contact state.

The electronic apparatus 200 as an apparatus which is operable by wirelessly receiving power from the wireless power transmitting apparatus 100 may charge the battery by using the power received wirelessly. The electronic apparatus that wirelessly receives the power may include all portable electronic apparatuses, for example, input/output apparatuses such as a smart phone or a smart device, a tablet computer, a multimedia terminal, a keyboard, a mouse, a video or audio auxiliary apparatus, and the like.

In the wireless power transmitting apparatus 100 according to the present invention, according to an inductive coupling scheme based on an electromagnetic inductive phenomenon by a wireless power signal, that is, resonance is generated in the electronic apparatus 200 by the wireless power signal transmitted by the wireless power transmitting apparatus 100 and power may be wirelessly transferred without a contact with the electronic apparatus 200 from the wireless power transmitting apparatus 100 by a resonance phenomenon and a magnetic field is changed by AC current in a primary coil by the electromagnetic inductive phenomenon and current is induced to a secondary coil to transfer the power.

When an intensity of current that flows on the primary coil of the wireless power transmitting apparatus 100 is changed, a magnetic field that passes through the primary coil or a transmission (Tx) coil is changed by the current and the changed magnetic field generates induced electromotive force to the secondary coil or reception (Rx) coil in the electronic apparatus 200.

When the wireless power transmitting apparatus 100 and the electronic apparatus 200 are placed so that the transmission coil at the wireless power transmitting apparatus 100 side and the reception coil at the electronic apparatus 200 side come close to each other and the wireless power transmitting apparatus 100 controls current of the transmission coil to be changed, the electronic apparatus 200 supplies power to a load such as a battery by using the electromotive force induced to the reception coil.

Since efficiency of the wireless power transferring by the inductive coupling scheme is influenced by a layout and a distance between the wireless power transmitting apparatus 100 and the electronic apparatus 200, the wireless power transmitting apparatus 100 is configured to include a flat interface surface and the transmission coil may be mounted on the bottom of the interface surface and one or more electronic apparatuses may be laid on the top of the interface surface. A space between the transmission coil mounted under the interface surface and the reception coil positioned on the top of the interface surface is made to be sufficiently small to increase the efficiency of the wireless power transferring by the inductive coupling scheme.

A mark indicating a location at which the electronic apparatus will be laid may be displayed on the top of the interface surface and the mark may indicate a location of the electronic apparatus, which makes an array between the transmission coil mounted on the bottom of the interface surface and the reception coil be appropriately achieved. A protrusion type structure for guiding the location of the electronic apparatus may be formed on the top of the interface surface and a magnetic body such as a magnet is formed on the bottom of the interface surface to guide the transmission coil and the reception coil to be normally arrayed by attraction with a magnetic body having a different pole, which is provided in the electronic apparatus.

Figure 2:
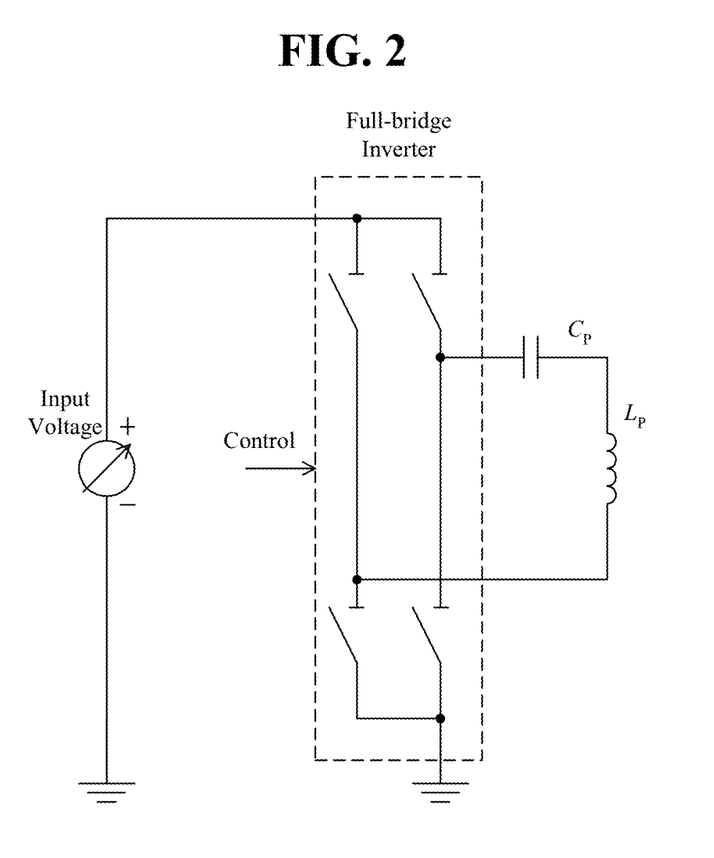
FIG. 2 conceptually illustrates a circuit configuration of a power converter of a transmitting apparatus for wirelessly transmitting power in an electromagnetic inductive scheme.

FIG. 2 conceptually illustrates a circuit configuration of a power converter of a transmitting apparatus for wirelessly transmitting power in an electromagnetic inductive scheme.

The wireless power transmitting apparatus may be configured to generally include a power supply and a power converter constituted by an inverter, and a resonance circuit, and the power supply may be a voltage source or a current source and the power converter converts power supplied from the power supply into the wireless power signal and transfers the wireless power signal to the receiving apparatus. And, the wireless power signal is formed in a magnetic field or an electromagnetic field type having a resonance characteristic and includes a coil that generates the wireless power signal.

The inverter converts a DC input into an AC waveform having desired voltage and a desired frequency through a switching element and a control circuit. In FIG. 2, a full-bridge inverter is illustrated and other types of inverters including a half-bridge inverter, and the like are available.

The resonance circuit is configured to include a primary coil Lp and a capacitor Cp that will transmit power by a magnetic induction scheme and the coil and the capacitor decide a primary resonance frequency of power transmission. The primary coil forms the magnetic field corresponding to the wireless power signal with a change of current and may be implemented in a disk spiral shape or a cylindrical solenoid shape.

The AC current converted by the inverter drives the resonance circuit, and as a result, the magnetic field is formed at the primary coil. The inverter generates AC having a frequency close to a resonant frequency of the resonance circuit to increase transmission efficiency of the transmitting apparatus and the inverter is controlled to change transmission efficiency of the transmitting apparatus.

Figure 3:
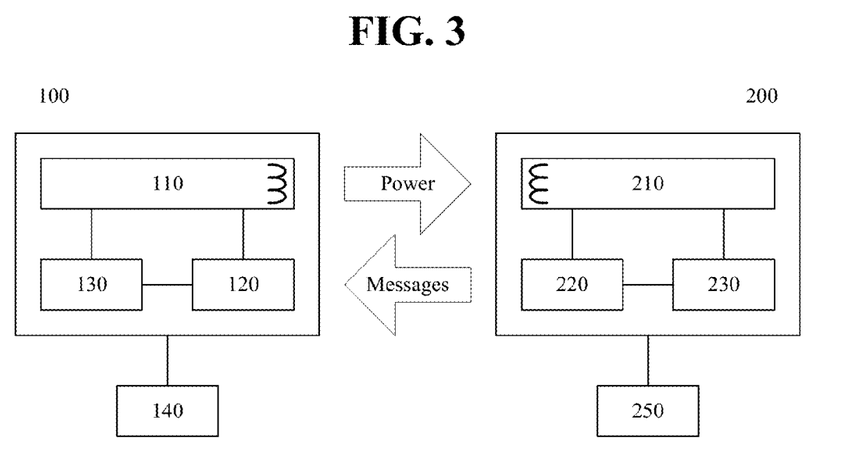
FIG. 3 illustrates a configuration for the wireless power transmitting apparatus and a wireless power receiving apparatus to transmit and receive power and a message.

FIG. 3 illustrates a configuration for the wireless power transmitting apparatus and a wireless power receiving apparatus to transmit and receive power and a message.

Since the power converter illustrated in FIG. 2 just transmits the power unilaterally regardless of a reception state of the receiving apparatus, a configuration for receiving a feed-back associated with the reception state from the receiving apparatus is required in the wireless power transmitting apparatus in order to transmit the power to fit the state of the receiving apparatus.

The wireless power transmitting apparatus 100 may be configured to include a power converter 110, a communication unit 120, a controller 130, and a power supply unit 140, the wireless power receiving apparatus 200 may be configured to include a power receiver 210, a communication unit 220, and a controller 230 and configured to further include a load 250 to which the received power is to be supplied.

The power converter 110 may be constituted by the inverter and the resonance circuit of FIG. 2, and configured to further include a circuit that may control characteristics such as a frequency, a voltage, a current, and the like used for forming the wireless power signal.

The communication unit 120 is connected to the power converter 110 to detect a power control message by demodulating a wireless power signal modulated by the receiving apparatus 200 wirelessly receiving power from the transmitting apparatus 100 in a magnetic induction scheme. The communication unit 120 senses current or voltage that flows on a resonance circuit via a current sensor or a voltage sensor connected to the power converter 110 and senses variation in amplitude of the current or voltage that flows on the resonance circuit or the primary coil based on the sensed current or voltage to detect the power control message.

The controller 130 decides at least one characteristic of the operating frequency, voltage, and current of the power converter 110 based on the message detected by the communication unit 120 and controls the power converter 110 to generate the wireless power signal suitable for the message. The communication unit 120 and the controller 130 may be configured as one module. The function of the current sensor or the voltage sensor that detects the current or voltage in the communication unit 120 may be implemented in the power converter 110 and the function to sense the variation in current waveform and generate the power control message based on the sensed variation may be implemented in the controller 130.

The power receiver 210 may include a matching circuit constituted by a secondary coil in which the induced electromotive force is generated according to the change of the magnetic field generated in the primary coil and a capacitor. The power receiver 210 may further include a rectifier circuit that rectifies the AC current that flows on the secondary coil to output DC current. Further, the power receiver 210 may include the voltage sensor or voltage sensor for sensing the current or voltage that flows on the secondary coil of the matching circuit.

The communication unit 220 of the receiving apparatus is connected to the power receiver 210 and changes the wireless power signal between the transmitting apparatus and the receiving apparatus by adjusting a load of the power receiver by a scheme that changes a resistance load in DC and/or a capacitive load in AC to transfer the power control message to the transmitting apparatus.

The controller 230 of the receiving apparatus controls each component included in the receiving apparatus. The controller 230 measures an output of the power receiver 210 in a current or voltage form via the sensor (the sensor may be included in the power receiver 210, connected to the power receiver 210 or included in the controller 230) and controls the communication unit 220 based thereon to transfer the power control message to the wireless power transmitting apparatus 100. The message may instruct the wireless power transmitting apparatus 100 to start or end transferring the wireless power signal and further control a characteristic of the wireless power signal.

The wireless power signal formed by the power converter 110 of the transmitting apparatus is received by the power receiver 210, the controller 230 of the receiving apparatus 200 controls the communication unit 220 to modulate the wireless power signal, and the controller 230 changes a reactance of the communication unit 220 to perform a modulation process that changes a wattage received from the wireless power signal. When the wattage received from the wireless power signal is changed, the current and/or voltage of the power converter 110 which forms the wireless power signal is also changed and the communication unit 120 of the transmitting apparatus 100 may perform a demodulation process by sensing the change in current and/or voltage of the power converter 110.

The controller 230 of the wireless power receiving apparatus 200 generates a packet including a message to be transferred to the wireless power transmitting apparatus 100 and modulates the wireless power signal to include the packet, and the controller 130 of the wireless power transmitting apparatus 100 may acquire the power control message by decoding a packet extracted through the communication unit 120. The controller 230 of the wireless power receiving apparatus 200 transmits a message for requesting the change in characteristic of the wireless power signal based on the wattage received through the power receiver 210 in order to control the received power.

Figure 4:
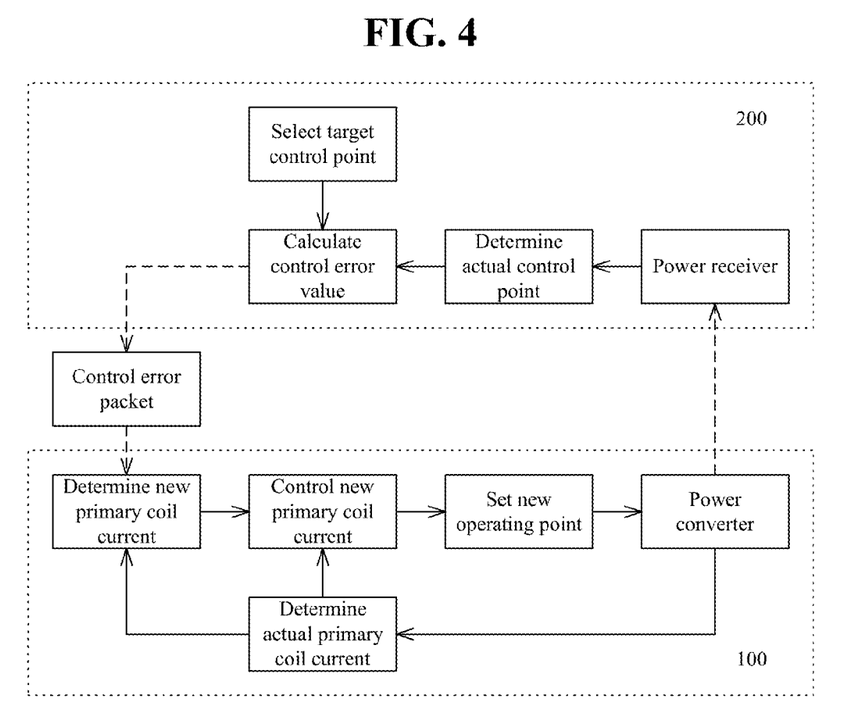
FIG. 4 illustrates a loop for controlling power transmission between the wireless power transmitting apparatus and the wireless power receiving apparatus.

FIG. 4 illustrates a loop for controlling power transmission between the wireless power transmitting apparatus and the wireless power receiving apparatus.

According to the change of the magnetic field generated by the power converter 110 of the transmitting apparatus, current is induced in the power receiver 210 of the receiving apparatus, and as a result, power is transmitted. The controller 230 of the receiving apparatus selects a desired control point, that is, desired output current and/or voltage and decides an actual control point of the power received through the power receiver 210.

The controller 230 of the receiving apparatus calculates a control error value based on the desired control point and the actual control point while the power is transmitted. For example, the controller 230 may take a difference between two output voltages or currents as the control error value. When low power is required to reach the desired control point, the control error value may become a minus value and when higher power is required to reach the desired control point, the control error value may be decided to become a plus value. The controller 230 of the receiving apparatus may generate a packet including the control error value by a scheme of changing reactance of the power receiver 210 with time and transmit the generated packet to the transmitting apparatus 100 via the communication unit 220.

The communication unit 120 of the transmitting apparatus demodulates the packet included in the wireless power signal modulated by the receiving apparatus 200 to detect the message and may demodulate a control error packet including the control error value.

The controller 130 of the transmitting apparatus decodes the control error packet extracted through the communication unit 120 to acquire the control error value and a new current value for transmitting power desired by the receiving apparatus may be decided based on an actual current value that actually flows on the power converter 110 and the control error value.

When a system is stabilized from a process of receiving the control error packet from the receiving apparatus, the controller 130 of the transmitting apparatus controls the power converter 110 so that the actual current value that flows on the primary coil becomes a new current value, that is a magnitude a frequency, a duty ratio, and the like of AC voltage applied to a new operating point become new values and controls the power converter 110 to maintain the new operating point so that the receiving apparatus can additionally communicate control information or status information.

An interaction between the wireless power transmitting apparatus 100 and the wireless power receiving apparatus 200 is constituted by four steps of selection, ping, identification and configuration, and power transfer. The selection step is a step for the transmitting apparatus to discover a target laid on the interface surface, the ping step is a step for verifying whether the target includes the receiving apparatus, the identification and configuration step as a preparatory step for transmitting the power to the receiving apparatus is a step for receiving appropriate information from the receiving apparatus and making a power transfer contract with the receiving apparatus, and the power transfer step is a step for actually transmitting the power to the receiving apparatus wirelessly by the interaction between the transmitting apparatus and the receiving apparatus.

In the ping step, the receiving apparatus 200 transmits a signal strength packet (SSP) indicating an inductive coupling degree of the primary coil and the secondary coil to the transmitting apparatus 100 through modulation of the resonance waveform. The SSP may be the voltage value rectified in the wireless power receiving apparatus In the identification/configuration step, the receiving apparatus 200 transmits to the transmitting apparatus 100 an identification packet including a version, a make code, apparatus identification information, and the like of the receiving apparatus 200, a configuration packet including information including maximum power, a power transferring method, and the like of the receiving apparatus 200, and the like.

In the power transfer step, the receiving apparatus 200 transmits to the transmitting apparatus 100 a control error packet (CEP) indicating a difference between an operating point where the receiving apparatus 200 receives the power signal and an operating point determined in the power transfer contact, a received power packet (RPP) indicating an average value of the power which the receiving apparatus 200 receives through the interface surface, and the like.

The communication unit 120 of the transmitting apparatus may extract a packet from variation in resonance waveform and the controller 130 may acquire the message through decoding the extracted packet and control the power converter 110 based on the acquired message to change the power transmission characteristic according to a request from the receiving apparatus 200.

Figure 5:
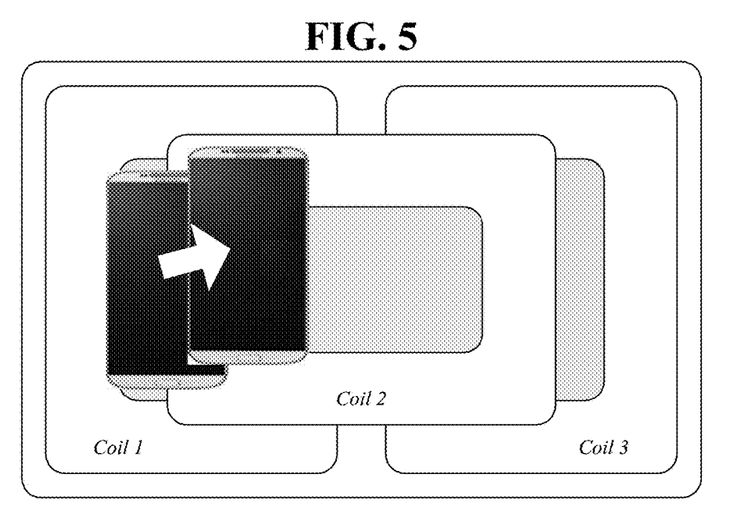
FIG. 5 illustrates that the position of an electronic apparatus corresponding to the receiving apparatus laid on a wireless power transmitting apparatus in a multiple coil scheme is changed.

FIG. 5 illustrates that the position of an electronic apparatus corresponding to the receiving apparatus laid on a wireless power transmitting apparatus in a multiple coil scheme is changed.

The wireless power transmitting apparatus with the multiple coil scheme which includes two or more primary coils of which the positions are different from each other may simultaneously transmit power wirelessly to two or more electronic apparatuses. For example, as illustrated in FIG. 5, in the wireless power transmitting apparatus with the multiple coil scheme including three primary coils of Coil 1 to Coil 3, when a smart phone moves to deviate from the center of Coil 1 while the power is wirelessly transmitted to the smart phone through Coil 1, the power transmission efficiency deteriorates and the smart phone as the receiving apparatus emits heat while trying various means for increasing the deteriorated transmission efficiency.

In the conventional wireless power transmitting apparatus in the multiple coil scheme, while the power is wirelessly transmitted through a predetermined primary coil after recognizing the receiving apparatus, an operation of discovering another primary coil having high efficiency is not performed, and as a result, even when the position of the receiving apparatus is changed, the power is transmitted with low efficiency through the existing connected primary coil.

That is, in the one-time recognition operating scheme algorithm in the related art, even though the receiving apparatus moves to the outskirts of an operating area of a wireless power transmission coil, when the receiving apparatus is within an operating range in which the power transmission is possible, the wireless power transmission is continued.

The control error packet transmitted by the receiving apparatus has a large value when a target point of the receiving apparatus is changed or the position of the receiving apparatus is changed on the surface of an interface of the transmitting apparatus.

Accordingly, in the present invention, the wireless power transmitting apparatus with the multiple coil scheme may recognizes the receiving apparatus and thereafter, determine whether the receiving apparatus moves during the wireless power transmission and decide whether to change the primary coil to be connected with the receiving apparatus based on a magnetic inductive coupling intensity with the receiving apparatus for each of two or more primary coils.

It may be determined whether the receiving apparatus moves on the wireless power transmitting apparatus based on the control error value included in the wireless power transmission communication packet and when the control error value is equal to or more than a predetermined value, it may be determined that the receiving apparatus moves.

When it is determined that the relative positions of the transmitting apparatus and the receiving apparatus that wirelessly transmit and receive the power are changed, coupling intensities, that is, signal intensity messages transmitted from the receiving apparatus are compared after attempting inductive coupling with the receiving apparatus with respect to each of two or more primary coils. A primary coil having a highest coupling intensity may be decided as the primary coil to be inductively coupled with the receiving apparatus based on the comparison and the power may be transmitted to the receiving apparatus through the decided primary coil.

To this end, the wireless power transmitting apparatus with the multiple coil scheme according to the embodiment of the present invention may perform a control algorithm to monitor variation of the control error value included in the communication packet transmitted from the receiving apparatus during the wireless power transmission, select the primary coil capable of transmitting the power to the receiving apparatus with high efficiency among two or more primary coils, that is, the primary coil having the high magnetic inductive coupling intensity with the secondary coil of the receiving apparatus, and to stop the power transmission to the receiving apparatus through communication appointed between the transmitting apparatus and the receiving apparatus for the time of reselecting the primary coil.

Figure 6:
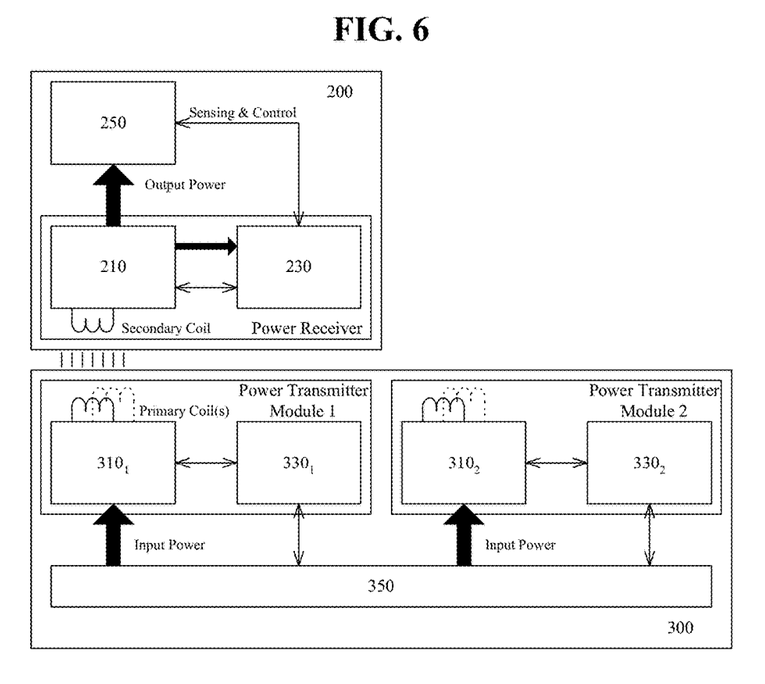
FIG. 6 illustrates a configuration of the wireless power transmitting apparatus in a multiple coil scheme.

FIG. 6 illustrates a configuration of the wireless power transmitting apparatus with the multiple coil scheme.

The wireless power receiving apparatus 200 may be configured to include a power receiver 210 constituted by the matching circuit including the secondary coil and the rectifier circuit and a controller 230 changing the wireless power signal between the transmitting apparatus and the receiving apparatus by measuring an output of the power receiver 210 in the current or voltage form and controlling a load of the power receiver 210 based on the measured output to transmit the power control message to the transmitting apparatus. The wireless power receiving apparatus 200 has the same configuration as the receiving apparatus of FIG. 3 except the communication unit and the controller are integrated into one.

The power receiver 210 may be configured to include a matching circuit including a secondary coil and a capacitor for receiving a wireless power signal transferred in the form of an electromagnetic field that resonates, a rectifier circuit for converting a power signal received in an AC form into DC, and a sensing unit for detecting a wattage of the power signal by measuring a current value or a voltage value of the power signal converted into the DC. And the power receiver 210 may further include a circuit that prevents overvoltage or overcurrent from being generated by the received power signal.

The controller 230 may generate a message for controlling the characteristic of the wireless power signal based on the wattage detected by the sensing unit of the sensor 210 and transmit the message to the wireless power transmitting apparatus 100. Further, the controller 230 may generate a message for requesting a start and an end of transmitting the wireless power and transmit the generated message to the wireless power transmitting apparatus 100.

The electronic apparatus including the wireless power receiving apparatus 200, for example, a wirelessly chargeable smart device may operate by receiving the power transferred from the wireless power transmitting apparatus 100 or operate by charging the battery through a charging unit by using the transferred power and using the power charged in the battery. The controller 230 may control the charging unit to charge a charger by using the power received through the power receiver 210.

The multiple coil scheme wireless power transmitting apparatus 300 of FIG. 6 includes two or more power transmitting modules including the primary coil for wirelessly transmitting the power and may be configured to include a system controller 350 selecting one or more modules that will transmit the power, connecting or disconnecting the modules, and separately or integrally controlling the connected modules. And in FIG. 6, it is illustrated that the multiple coil scheme wireless power transmitting apparatus 300 includes two power transmitting modules.

Each power transmitting module may be configured to include the power converter 110 including the resonance circuit of the primary coil and an inverter and a controller 330 for controlling the operation of the power converter 110. The controller 330 may have a structure in which the communication unit 120 and the controller 130 in the configuration of the transmitting apparatus of FIG. 3 are integrated or be constituted by only the function of the communication unit 120 and the system controller 350 may take charge of the function of the controller 130.

Alternatively, in the multiple coil scheme wireless power transmitting apparatus 300, each power transmitting module may be constituted by only the resonance circuit including the primary coil and the capacitor, the inverter may be shared by the respective power transmitting module, and the sensing unit for extracting the packet transmitted by the receiving apparatus from the variation in waveform of the current that flows on the primary coil may be included in each power transmitting module or provided separately from the power transmitting modules to be shared by the respective transmitting modules. Alternatively, the inverter, two or more resonance circuits, and the sensing unit may be commonly designated as the power converter. A switching unit for selecting connection of the power transmitting modules, and the inverter and/or the sensing unit may be separately provided and the system controller 350 may select the power transmitting module by controlling the switching unit and integrally perform a role of the controller 330.

The primary coils of the power transmitting modules may be positioned at different locations or partially overlapped below the flat interface surface of the transmitting apparatus.

The system controller 350 controls each module to receive the power control message indicating the intensity of the wireless power signal or the power control message indicating identification information of the receiving apparatus from the receiving apparatus on the interface surface, verify the primary coil of which module among two or more modules the receiving apparatus is closer to based on the received result, and determine through which module to transmit the power.

A portion of the interface surface through which the magnetic field having high efficiency when the wireless power transmitting apparatus 300 wirelessly transfers the power to the receiving apparatus 200 may be referred to as an active area and a single transmission coil or a combination of one or more transmission coils that form the magnetic field passing through the active area may be referred to as a primary cell.

The system controller 350 may sense the location of the receiving apparatus 200 and decide the active area based on the sensed location and connect the transmission module constituting the primary cell corresponding to the active area and control the primary coil of the corresponding transmission module to be inductively coupled to the secondary coil of the receiving apparatus 200.

Figure 7:
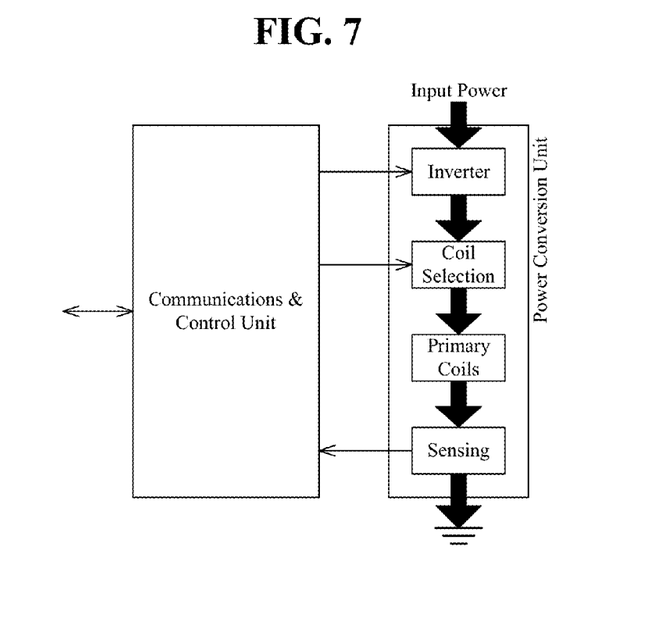
FIG. 7 conceptually illustrates a function block for selecting a coil inductively coupled with the wireless receiving apparatus in the wireless power transmitting apparatus in a multiple coil scheme.

FIG. 7 conceptually illustrates a function block for selecting a coil inductively coupled with the wireless receiving apparatus in the wireless power transmitting apparatus in the multiple coil scheme.

Power is supplied from a voltage source or a current source to the power converter for wirelessly supplying the power to the receiving apparatus (input power), the supplied power is converted into AC current at a frequency, voltage, and a duty ratio of a control point for wireless transmission according to the control by the system controller in the inverter (inverter), the primary coil to be magnetically inductively coupled with the receiving apparatus is selected by the system controller (coil selection), the AC current generated by the inverter is applied to the selected coil, and as a result, the power is wirelessly transmitted to the receiving apparatus (primary coils), the current or voltage that flows through the primary coil is measured and variation in amplitude loaded on the waveform of the current or voltage that flows through the primary coil is sensed (sensing), an actual operating point is detected and a packet fed back from the receiving apparatus is measured, the magnetic inductive coupling intensity with the receiving apparatus is verified based on the detected actual operating point and the measured packet and it is determined whether the receiving apparatus moves, and the primary coil to be coupled with the receiving apparatus is again selected to maintain the primary coil as it is or change the primary coil to another primary coil.

Figure 8:
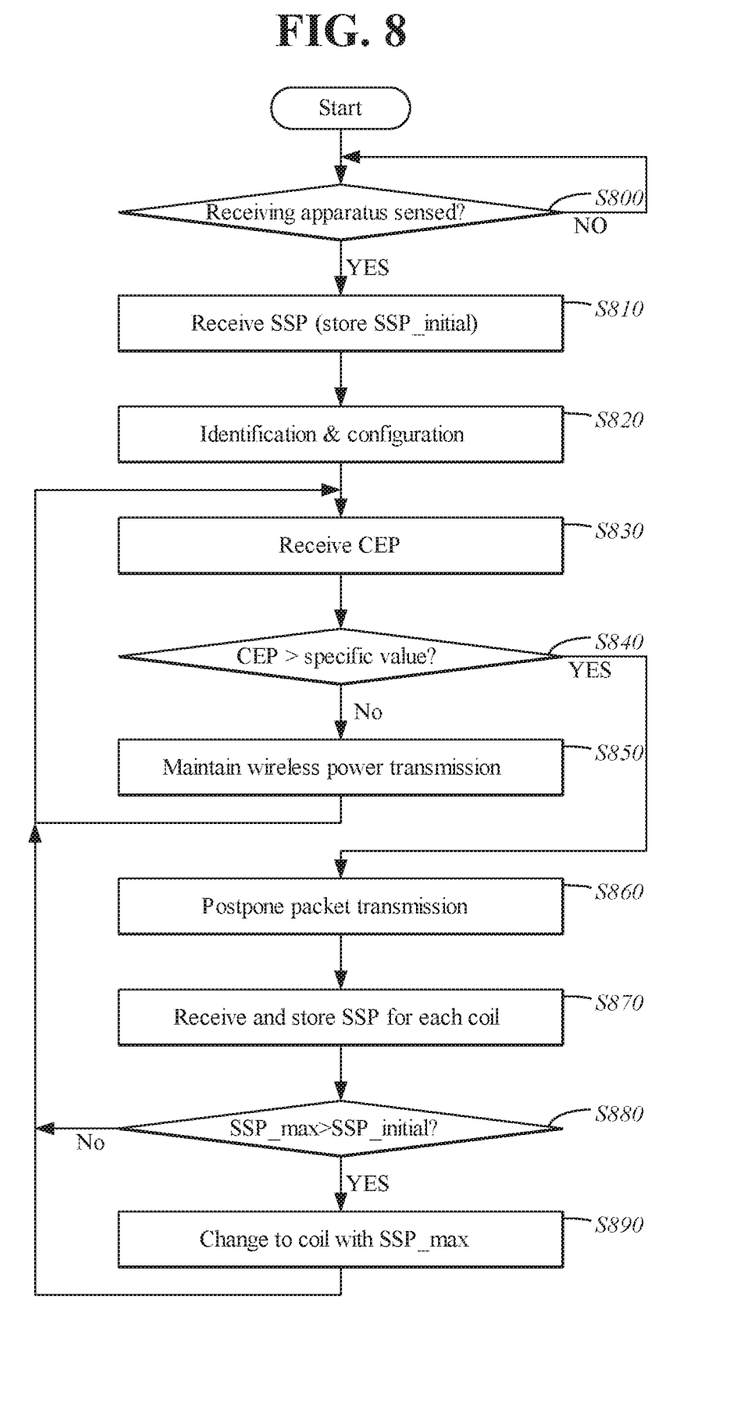
FIG. 8 illustrates an operational flowchart for a method for selecting a transmission coil while the wireless power transmitting apparatus wirelessly transmits power according to an embodiment of the present invention.

FIG. 8 illustrates an operational flowchart for a method for selecting a transmission coil while the wireless power transmitting apparatus wirelessly transmits power according to an embodiment of the present invention.

The system controller 350 of the multiple coil scheme wireless power transmitting apparatus 300 senses whether the receiving apparatus 200 or the electronic apparatus including the receiving apparatus is laid on the interface surface (S800). The system controller 350 may sequentially supply the AC current to cause the inductive electromotive force on the primary coil of each module by controlling the inverter while switching two or more power transmitting modules, detect the variation which occurs in waveform of the AC current that flows on the primary coil or the voltage measured on the primary coil from the sensing unit connected to each module, and verify whether the receiving apparatus is laid on the interface surface or which power transmitting module the receiving apparatus is laid at the active area on the interface corresponding to.

When sensing the receiving apparatus 200 on the interface surface (YES in S800), the system controller 350 performs a ping step with the receiving apparatus by controlling the power transmitting module corresponding to the area on which the receiving apparatus is laid. In the ping step, the receiving apparatus transmits a signal strength packet (SSP) indicating the inductive coupling intensity of the primary coil of the corresponding power transmitting module and the secondary coil through modulation of the resonance waveform and the system controller 350 extracts the signal strength packet from the variation in waveform of the current that flows on the primary coil through the sensing unit of the power transmitting module, decodes the extracted signal strength packet, and stores the decoded signal strength packet as an initial value (SSP_initial) (S810).

The system controller 350 performs an identification/configuration step as a preparation step for transmitting the power to the receiving apparatus to receives appropriate information from the receiving apparatus and conclude a power transmission contract with the receiving apparatus based thereon (S820). The system controller 350 may receive an identification packet including a version, a manufacturer code, apparatus identification information, and the like and a configuration packet including information such as maximum power, a power transmitting method, and the like from the receiving apparatus.

Thereafter, the system controller 350 performs a power transmitting step of actually wirelessly transmitting the power to the receiving apparatus through the interaction with the receiving apparatus. When the receiving apparatus transmits a control error packet indicating a difference between an operating point of receiving the power signal and an operating point determined in the power transmission contract, the system controller 350 receives the transmitted control error packet (S830) and controls the power transmitting module based on the received control error packet to change an operating point of the resonance circuit.

The system controller 350 compares a control error value included in the control error packet and a predetermined value (S840). In the case where the control error value is smaller than a predetermined value (NO in S840), the system controller 350 determines the case as a change in control error value according to a normal power transmission such as a case in which the receiving apparatus changes the operating point of a power receiving operation, and the like.

On the contrary, the system controller 350 determines that the receiving apparatus moves on the interface surface when the control error value is larger than the predetermined value (YES in S840) and provisionally stops an operation of transmitting the power to the receiving apparatus through the present module and postpones packet transmission to the receiving apparatus (S860).

The system controller 350 attempts magnetic inductive coupling between a selected power transmitting module and the receiving apparatus by sequentially controlling the respective power transmitting modules. The system controller 350 performs the ping step, with each of one or more respective power transmitting modules which are close to the area on which the receiving apparatus is laid and as a result can make a magnetic inductive coupling with the receiving apparatus. In the pin step, the system controller 350 receives the signal strength packet (SSP) from the receiving apparatus and stores the signal strength value included in the signal strength packet (S870).

The system controller 350 finds a largest value (SSP_max) by comparing the stored signal strength values with each other and compares the largest value with the initial value (SSP_initial) stored in step S810 (S880). When the largest value among the signal strength values received through the respective modules in step S870 is smaller than the initial value (NO in S880), the module which performed the operation of transmitting the wireless power through steps S800 to S830 is selected again to be magnetically inductively coupled with the receiving apparatus to transmit the wireless power.

On the contrary, when the largest value among the signal strength values received through the respective modules in step S870) is larger than the initial value (YES in S880), the system controller 350 may change the power transmitting module that will transmit the power to the receiving apparatus to the module having the maximum signal strength value (SSP_max) and perform a magnetic inductive coupling with the receiving apparatus through the corresponding module. Thereafter, steps S830 to S850 may be repeated.

Instead of comparing the largest value among the signal strength values received through the respective modules with the initial value in step S880, the power transmitting module having the maximum signal strength value is selected as the power transmitting module that will transmit the power to the receiving apparatus and the current module is switched to the selected module to perform the ping step, the identification/configuration step, and the power transmitting step.

As such, the wireless power transmitting apparatus in the multiple coil scheme monitors a variation level of the control error value and in the case where the variation level is equal to or higher than a specific level, determines the case as the case where the receiving apparatus moves and switches the current mode to a mode to select the power transmitting module (primary coil) to transmit the power through the primary coil having high transmission efficiency.

The present invention is not limited to the embodiments, and it would be apparent to those skilled in the art that various changes and modifications might be made to these embodiments without departing from the spirit and the scope of the invention. Accordingly, it should be appreciated that the changed example or modified examples belong to the appended claims of the present invention.

What is claimed is:

1. A method for transmitting power wirelessly, the method comprising:
    detecting whether a receiving apparatus moves based on an error value received from the receiving apparatus through a first primary coil among two or more primary coils during wirelessly transmitting the power to the receiving apparatus through magnetic inductive coupling of the first primary coil with the receiving apparatus, the error value indicating the difference between a desired control point determined in a power transfer contract and an actual control point where the receiving apparatus receives the power;
    performing operations of magnetic inductive coupling with the receiving apparatus for each of the two or more primary coils when it is detected that the receiving apparatus moves; and
    determining whether to change from the first primary coil connected with the receiving apparatus to a second primary coil among the two or more primary coils based on results of the operations.

2. The method of claim 1, wherein in the detecting, when the error value is larger than a predetermined value, it is determined that the receiving apparatus moves.

3. The method of claim 1, wherein:
    in the performing, signal strength messages received from the receiving apparatus are received and stored for respective primary coils magnetically inductively coupled with the receiving apparatus, and
    in the determining, whether to change from the first primary coil connected with the receiving apparatus to the second primary coil is determined based on the stored signal strength messages.

4. The method of claim 3, wherein in the determining, it is determined that the received apparatus is to be connected through a primary coil, among the two or more primary coils, corresponding to a largest value among signal strength values included in the signal strength messages.

5. An apparatus for transmitting power wirelessly, the apparatus comprising:
    a power converter including an inverter for converting DC power into AC power, two or more resonance circuits, and a sensing unit for measuring current or voltage that flows on the resonance circuits;
    a switching unit for connecting the two or more resonance circuits to the inverter; and
    a controller configured for:
    selecting a resonance circuit among the two or more resonance circuits to be connected to the inverter by controlling the switching unit,
    extracting a message transmitted by a receiving apparatus that receives the power through magnetic induction of the selected resonance circuit based on a change in current or voltage measured by the sensing unit,
    controlling power transmission to the receiving apparatus by controlling the inverter based on the extracted message, and
    selecting a first resonance circuit among the two or more resonance circuits to transmit the power to the receiving apparatus based on the message,
    wherein the controller detects whether the receiving apparatus moves based on an error value received from the receiving apparatus through the first resonance circuit during wirelessly transmitting the power from the first resonance circuit to the receiving apparatus, performs operations of magnetic inductive coupling with the receiving apparatus for each of the two or more resonance circuits when detecting that the receiving apparatus moves, and determines whether to change the first resonance circuit connected with the receiving apparatus to a second resonance circuit among the two or more resonance circuits based on results of the operations, the error value indicating the difference between a desired control point determined in a power transfer contract and an actual control point where the receiving apparatus receives the power.

6. The apparatus of claim 5, wherein the controller determines that the receiving apparatus moves when the error value is larger than a predetermined value.

7. The apparatus of claim 5, wherein the controller receives and stores signal strength messages received from the receiving apparatus for respective resonance circuits magnetically inductively coupled with the receiving apparatus and determines whether to change the first resonance circuit connected with the receiving apparatus to the second resonance circuit based on the stored signal strength messages.

8. The apparatus of claim 7, wherein the controller determines that the receiving apparatus is to be connected through a resonance circuit, among the two or more resonance circuits, corresponding to a largest value among signal strength values included in the signal strength messages.

* * * * *